US012626689B2

(12) United States Patent
Fedorov et al.

(10) Patent No.:  US 12,626,689 B2
(45) Date of Patent:  May 12, 2026

(54) DETERMINING EMOTION SEQUENCES FOR SPEECH FOR CONVERSATIONAL AI SYSTEMS AND APPLICATIONS

(71) Applicant: NVIDIA Corporation, Santa Clara, CA (US)

(72) Inventors: Ilia Fedorov, Moscow (RU); Dmitry Korobchenko, Yerevan (AM)

(73) Assignee: NVIDIA Corporation, Santa Clara, CA (US)

( * ) Notice: Subject to any disclaimer, the term of this patent is extended or adjusted under 35 U.S.C. 154(b) by 272 days.

(21) Appl. No.: 18/229,099

(22) Filed: Aug. 1, 2023

(65) Prior Publication Data

US 2025/0046298 A1      Feb. 6, 2025

(51) Int. Cl.
*G10L 15/06*          (2013.01)
*G10L 15/16*          (2006.01)

(52) U.S. Cl.
CPC ............ *G10L 15/063* (2013.01); *G10L 15/16* (2013.01); *G10L 2015/0631* (2013.01)

(58) Field of Classification Search
CPC . G10L 15/16; G10L 2015/0631; G10L 25/30; G10L 25/63
See application file for complete search history.

(56) References Cited

U.S. PATENT DOCUMENTS

| | | | | |
|---|---|---|---|---|
| 10,521,946 | B1 * | 12/2019 | Roche | G10L 13/00 |
| 11,854,538 | B1 * | 12/2023 | Rozgic | G10L 25/63 |
| 2020/0043514 | A1 * | 2/2020 | Liu | G06N 3/044 |
| 2024/0004606 | A1 * | 1/2024 | Zhu | G06V 40/166 |

* cited by examiner

*Primary Examiner* — Bhavesh M Mehta
*Assistant Examiner* — Jangwoen Lee
(74) *Attorney, Agent, or Firm* — IRON SUMMIT IP LLP

(57)          ABSTRACT

In various examples, determining emotion sequences for speech in conversational AI systems and applications is described herein. Systems and methods are disclosed that use one or more first machine learning models to determine a sequence of emotional states associated with audio data representing speech. To use the first machine learning model (s), the systems and methods may train the first machine learning model(s) using one or more second machine learning models, where the second machine learning model(s) is trained to determine scores indicating accuracies associated with sequences of emotional states. For instance, the second machine learning model(s) may be trained to determine the scores using audio data representing speech, sequences of emotional states associated with the speech, and indications of which sequences of emotional states better represent the speech as compared to other sequences of emotional states.

20 Claims, 12 Drawing Sheets

100

600

AUDIO DATA
602

MACHINE LEARNING
MODEL(S)
102

SEQUENCE DATA
604

ANIMATION
COMPONENT
606

ANIMATION DATA
608

PRESENTATION
610

Character
612

700
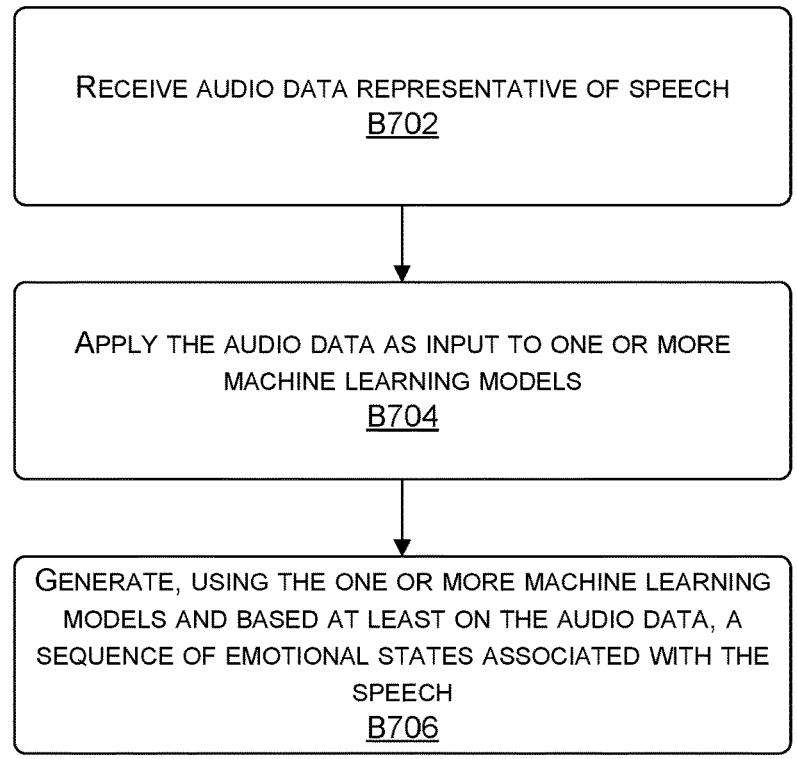
RECEIVE AUDIO DATA REPRESENTATIVE OF SPEECH
B702
APPLY THE AUDIO DATA AS INPUT TO ONE OR MORE
MACHINE LEARNING MODELS
B704
GENERATE, USING THE ONE OR MORE MACHINE LEARNING
MODELS AND BASED AT LEAST ON THE AUDIO DATA, A
SEQUENCE OF EMOTIONAL STATES ASSOCIATED WITH THE
SPEECH
B706
FIGURE 7

800
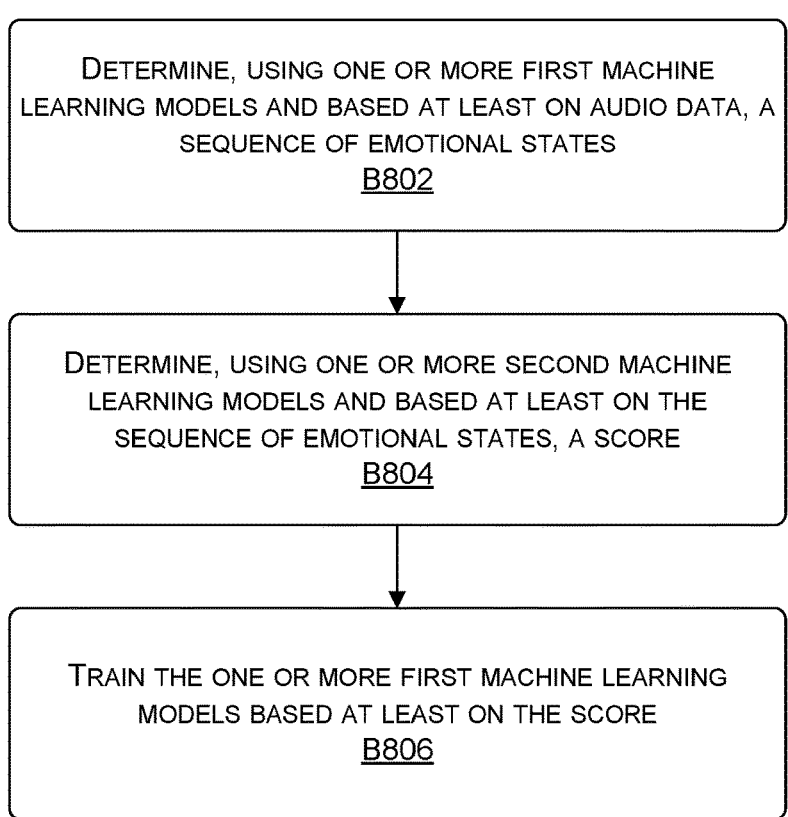
DETERMINE, USING ONE OR MORE FIRST MACHINE LEARNING MODELS AND BASED AT LEAST ON AUDIO DATA, A SEQUENCE OF EMOTIONAL STATES
B802
DETERMINE, USING ONE OR MORE SECOND MACHINE LEARNING MODELS AND BASED AT LEAST ON THE SEQUENCE OF EMOTIONAL STATES, A SCORE
B804
TRAIN THE ONE OR MORE FIRST MACHINE LEARNING MODELS BASED AT LEAST ON THE SCORE
B806
FIGURE 8

900

RECEIVE GROUND TRUTH DATA REPRESENTATIVE OF ONE
OR MORE RATINGS FOR SEQUENCES OF EMOTIONAL
STATES ASSOCIATED WITH AUDIO DATA
B902

DETERMINE, USING ONE OR MORE MACHINE LEARNING
MODELS AND BASED AT LEAST ON THE AUDIO DATA AND
THE SEQUENCES OF EMOTIONAL STATES, SCORES
ASSOCIATED WITH THE SEQUENCES OF EMOTIONAL STATES
B904

TRAIN THE ONE OR MORE MACHINE LEARNING MODELS
BASED AT LEAST ON THE GROUND TRUTH DATA AND THE
SCORES
B906

TRAIN, USING FIRST AUDIO DATA REPRESENTATIVE OF FIRST USER SPEECH AND ONE OR MORE FIRST SEQUENCES OF EMOTIONAL STATES ASSOCIATED WITH THE FIRST SPEECH, ONE OR MORE FIRST MACHINE LEARNING MODELS TO DETERMINE ONE OR MORE SCORES ASSOCIATED WITH ONE OR MORE SECOND SEQUENCES OF EMOTIONAL STATES
B1002

TRAIN, USING THE ONE OR MORE FIRST MACHINE LEARNING MODELS AND SECOND AUDIO DATA REPRESENTATIVE OF SECOND SPEECH, ONE OR MORE SECOND MACHINE LEARNING MODELS TO DETERMINE THE ONE OR MORE SECOND SEQUENCES OF EMOTIONAL STATES ASSOCIATED WITH THE SECOND SPEECH
B1004

DETERMINING EMOTION SEQUENCES FOR SPEECH FOR CONVERSATIONAL AI SYSTEMS AND APPLICATIONS

BACKGROUND

Many applications, such as gaming applications, interactive applications, communications applications, multimedia applications, and/or the like, use animated characters or digital avatars that interact with users of the applications and/or other animated characters within the applications. In order to provide more realistic experiences for the users, some animated characters interact using both audio, such as speech, as well as visual indicators. For example, when an animated character is interacting with a user, an application may both sync the lip movements of the animated character with speech being output by the animated character while also causing the animated character to visually express facial emotions. Visually expressing facial emotions may include causing the animated character to move various features of the face, such as the eyes, the mouth, the eyebrows, the nose, the cheeks, and/or other features of the face.

As such, various techniques have been developed to determine emotions associated with speech that is output by animated characters. For example, a conventional system may process audio data representing user speech using a machine learning model. The machine learning model may then determine, based at least on the processing, an emotional state associated with the speech. However, based on a length of the speech, a context of the speech, and/or other factors associated with the speech, the speech may actually be associated with multiple emotional states. For example, a user that outputs the speech may include a first emotional state, such as happy, during a first part of the speech and a second emotional state, such as angry, during a second part of the speech. As such, by determining only a single emotional state for the speech, the output from the machine learning model may not be adequate enough for animating a character in a way that accurately expresses these changes in emotion associated with the speech.

SUMMARY

Embodiments of the present disclosure relate to determining emotion sequences for speech in conversational artificial intelligence (AI) systems and applications. Systems and methods are disclosed that use one or more first machine learning models to determine a sequence of emotional states associated with audio data representing speech. To use the first machine learning model(s), the systems and methods may train the first machine learning model(s) using one or more second machine learning models, where the second machine learning model(s) is trained to determine scores indicating accuracies associated with sequences of emotional states. For instance, the second machine learning model(s) may be trained to determine the scores using audio data representing speech, sequences of emotional states associated with the speech, and/or indications of which sequences of emotional states better represent the speech as compared to other sequences of emotional states. The second machine learning model(s) may then process outputs from the first machine learning model(s), such as sequences of emotional states, to determine scores associated with the outputs. Additionally, the first machine learning model(s) may be trained based at least on the scores.

In contrast to conventional systems, such as those described above, the current systems, in some embodiments, use the first machine learning model(s) that is able to determine a sequence of emotional states associated with speech rather than just a single emotional state. As described herein, by determining the sequence of emotional states, the emotional states determined by the first machine learning model(s) may better represent actual emotions associated with the speech as compared to the single emotional state. For instance, in some examples, the sequence of emotional states may better represent the speech since actual humans change emotional states while speaking, such as express different emotions for different parts of the speech. As such, an animated character that is outputting speech should also change emotional states while outputting the speech rather than just maintaining a single emotional state.

BRIEF DESCRIPTION OF THE DRAWINGS

The present systems and methods for determining emotion sequences for speech in conversational AI systems and applications are described in detail below with reference to the attached drawing figures, wherein:

FIG. 7 illustrates a flow diagram showing a method for determining a sequence of emotional states associated with speech, in accordance with some embodiments of the present disclosure;

FIG. 8 illustrates a flow diagram showing a method for training one or more machine learning models to determine sequences of emotional states associated with speech, in accordance with some embodiments of the present disclosure;

FIG. 9 illustrates a flow diagram showing a method for training one or more machine learning models to determine scores associated with sequences of emotional states, in accordance with some embodiments of the present disclosure;

FIG. 10 illustrates a flow diagram showing a method for training one or more machine learning models to determine sequences of emotional states, in accordance with some embodiments of the present disclosure;

DETAILED DESCRIPTION

Figure 1:
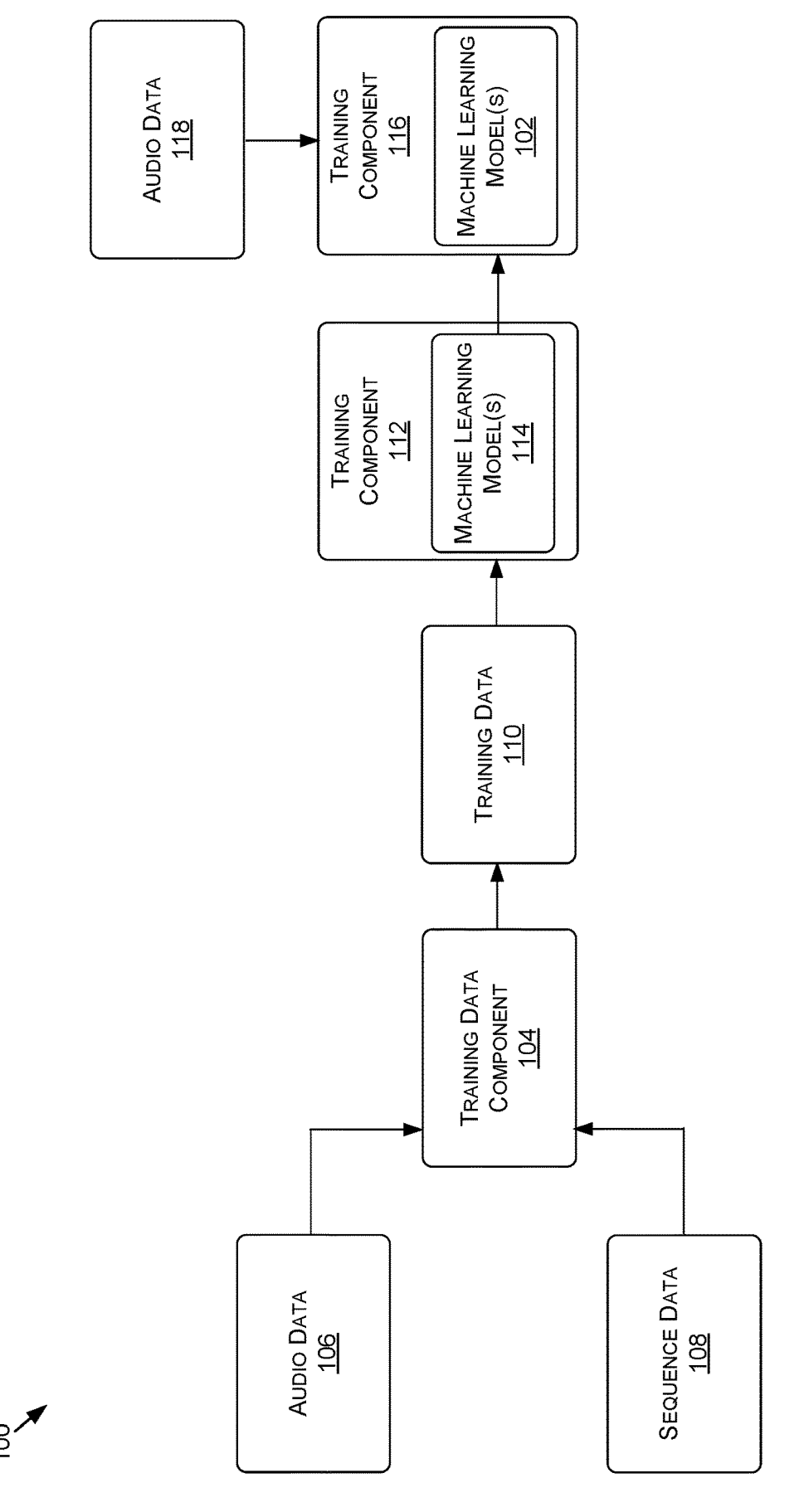
FIG. 1 illustrates an example data flow diagram for a process of training one or more machine learning models to determine sequences of emotional states associated with speech, in accordance with some embodiments of the present disclosure.

Systems and methods are disclosed related to determining emotion sequences for speech in conversational AI systems and applications. For instance, a system(s) may train one or more first machine learning models to determine sequences of emotional states associated with speech. To train the first machine learning model(s), the system(s) may initially generate, determine, and/or obtain training data for training one or more second machine learning models that are configured to determine scores indicating whether sequences of emotional states accurately represent speech. As described herein, the training data may include, but is not limited to, audio data representing instances of speech, data representing sequences of emotional states associated with the instances of speech, data indicating which sequences of emotional states better represent the instances of speech as compared to other sequences of emotional states, and/or data indicating whether multiple sequences of emotional stats equally represent the instances of speech. In some examples, the system(s) may generate the training data using inputs from one or more users associated with the system(s).

For example, and for audio data representing an instance of speech, the system(s) may use the audio data and sequences of emotional states to generate video data representing videos depicting animated characters expressing the sequences of emotional states. For instance, the system(s) may generate at least a first video depicting an animated character expressing a first sequence of emotional states for the speech and a second video depicting an animated character expressing a second, different sequence of emotional states for the speech. One or more users may then view the videos and select which video better represents emotions for the speech. The system(s) may then use this selection to generate the training data associated with the instance of speech. Additionally, the system(s) may then perform similar processes, such as by using additional audio data representing one or more additional instances of speech, to generate additional training data.

The system(s) may then use the training data to train the second machine learning model(s). For example, and for an instance of speech, the second machine learning model(s) may process the audio data representing the speech and data representing the first sequence of emotional states to determine a first score. The second machine learning model(s) may additionally process the audio data representing the speech and data representing the second sequence of emotional states to determine a second score. The system(s) may then update the second machine learning model(s) based at least on the first score, the second score, and the indication of which sequence of emotional states better represents the speech and/or that the sequences of emotional states equally represent the speech. For example, the system(s) may determine a loss based at least on the first score, the second score, and the indication of which sequence of emotional states better represents the speech and/or that the sequences of emotional states equally represent the speech. The system(s) may then update one or more parameters and/or weights associated with the second machine learning model(s) using the loss. Additionally, the system(s) may perform similar processes using one or more additional instances of speech.

The system(s) may then use the trained second machine learning model(s) to train the first machine learning model(s). For example, the first machine learning model(s) may process audio data representing speech and, based at least on the processing, determine a sequence of emotional states associated with the speech. The second machine learning model(s) may then process the audio data and data representing the sequence of emotional states and, based at least on the processing, determine a score associated with the sequence of emotional states. As described herein, the score may indicate how accurately the sequence of emotional states represents actual emotional states associated with the speech. The system(s) may then update the first machine learning model(s) based at least on the score. For example, the system(s) may determine a loss based at least on the score and then update one or more parameters and/or weights associated with the first machine learning model(s) using the loss. Additionally, the system(s) may perform similar processes using one or more additional instances of speech.

In some examples, the system(s) may use additional and/or alternative techniques to train the first machine learning model(s). For example, the system(s) may further process the audio data representing the speech using one or more third machine learning model(s) that are also trained to determine sequences of emotional states associated with speech. For instance, based at least on the processing, the third machine learning model(s) may determine an additional sequence of emotional states associated with the speech. The system(s) may then further train the first machine learning model(s) based at least on the sequence of emotional states determined using the first machine learning model(s) and the additional sequence of emotional states determined using the third machine learning model(s). For example, the system(s) may determine an additional loss based at least on the sequence of emotional states and the additional sequence of emotional states. The system(s) may then update one or more parameters and/or weights associated with the first machine learning model(s) using the additional lost. Additionally, the system(s) may perform similar processes using one or more additional instances of speech.

While the examples described herein are directed to determining sequences of emotional states associated with audio data represent speech, in other examples, similar processes may be performed to determine sequences of emotional states associated with audio data representing additional and/or alternative sounds—e.g., animal sounds, vehicle sounds, etc. Additionally, while the examples described herein are directed to training the first machine learning model(s) to determine sequences of emotional states for animating characters, in some examples, similar processes may be used to train the first machine learning model(s) to determine other types of motions or actions associated with speech. For example, similar processes may be performed to train the first machine learning model(s) to determine sequences of gestures for animating characters, sequences of facial expressions for animated characters, and/or any other types of motions associated with speech.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., in an in-vehicle infotainment system), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implementing one or more language models-such as one or more large language models (LLMs), systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example data flow diagram for a process 100 of training one or more machine learning models 102 (also referred to, in some examples, as a "first machine learning model(s) 102") to determine sequences of emotional states associated with speech, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include a training data component 104 processing audio data 106 and sequence data 108. As described herein, the audio data 106 may represent one or more instances of speech (and/or other types of sound). For example, the audio data 106 may include first audio data 106 representing first speech, second audio data 106 representing second speech, third audio data 106 representing third speech, and/or so forth. Additionally, the sequence data 108 may represent one or more sequences of emotional states associated with one or more of the instances of the speech. For example, and for an instance of speech, the sequence data 108 may represent at least a first sequence of emotional states associated with the speech and a second, different sequence of emotional states associated with the speech. In some examples, the sequence data 108 representing a sequence of emotional states may include one or more vectors, where a respective vector represents a respective emotional state. For example, a sequence of emotional states may be represented using a first vector that represents a first emotional state associated with a first time and/or a first keyframe of the audio data 106, a second vector that represents a second emotional state associated with a second time and/or a second keyframe associated with the audio data 106, a third vector that represents a third emotional state associated with a third time and/or a third keyframe associated with the audio data 106, and/or so forth.

The process 100 may include the training data component 104 generating, based at least on processing the audio data 106 and the sequence data 108, training data 110. As described herein, the training data 110 may represent at least the instances of the speech, the sequences of emotional states associated with the speech, indications of which sequences of emotional states better represent the speech as compared to other sequences of emotional states, indications that sequences of emotional states equally represent the speech, and/or any other type of data. In some examples, the training data component 104 may perform one or more processes to generate the training data 110, such as by using one or more inputs from one or more users.

Figure 2:
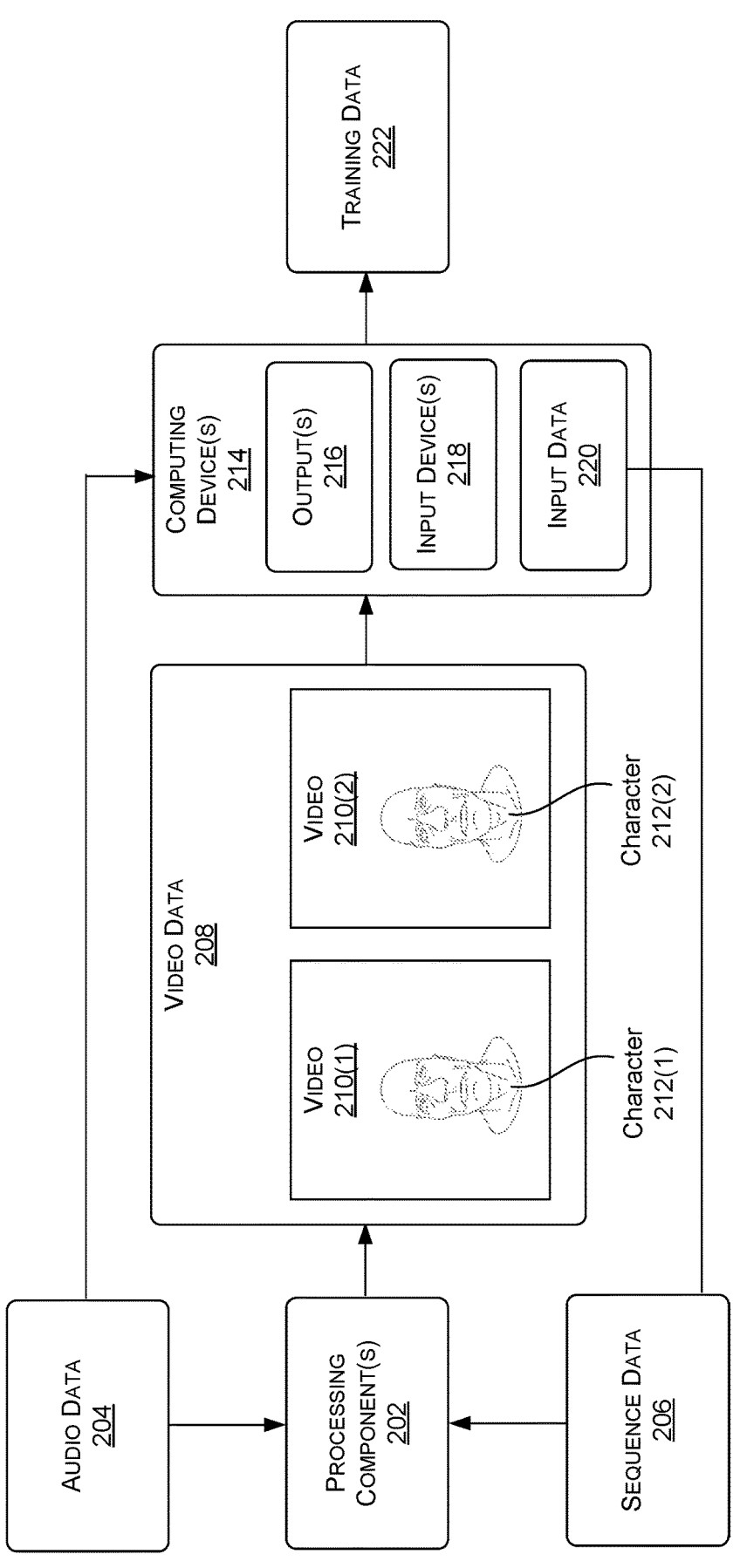
FIG. 2 illustrates an example of generating training data using audio data representing speech and sequences of emotional states associated with the speech, in accordance with some embodiments of the present disclosure.

For more details, FIG. 2 illustrates an example of generating training data using audio data representing speech and sequences of emotional states associated with the speech, in accordance with some embodiments of the present disclosure. As shown, one or more processing components 202 may process audio data 204 (which may represent, and/or include, the audio data 106) and sequence data 206 (which may represent, and/or include, the sequence data 108). Based at least on the processing, the processing component(s) 202 may generate video data 208 representing videos 210(1)-(2) depicting animated characters 212(1)-(2) performing various emotions. For example, and for an instance of speech represented by the audio data 204, the first video 210(1) may depict the first animated character 212(1) expressing emotions that are based on a first sequence of emotional states represented by the sequence data 206 and the second video 210(2) may depict the second animated character 212(2) expressing emotions that are based on a second sequence of emotional states represented by the sequence data 206. While the example of FIG. 2 only illustrates two videos 210(1)-(2) associated with a single instance of speech, in other examples, the processing component(s) 202 may generate any number of videos associated with any number of instances of speech.

As further illustrated by the example of FIG. 2, one or more computing devices 214 may receive the video data 208 and/or the audio data 204. The computing device(s) 214 may then use one or more output devices 216 to provide content to one or more users. As described herein, an output device 216 may include, but is not limited to, a display, a speaker, a haptic feedback device, and/or any other type of device. For example, the computing device(s) 214 may display the first video 210(1) using a display while also outputting, using a speaker(s), the corresponding speech represented by the audio data 204. The computing device(s) 214 may also display the second video 210(1) using a display while also outputting, using a speaker(s), the corresponding speech represented by the audio data 204. In some examples, the computing device(s) 214 displays the videos 210(1)-(2) together while, in other examples, the computing device(s) 214 displays the videos 210(1)-(2) at different times (e.g., displays the first video 210(1) followed by displaying the second video 210(2)).

The user may then use one or more input devices 218 to provide one or more inputs (which may be represented by input data 220) indicating (1) whether the first sequence of emotional states performed by the first animated character 212(1) better represents the speech as compared to the second sequence of emotional states performed by the second animated character 212(2), (2) whether the second sequence of emotional states performed by the second animated character 212(2) better represents the speech as compared to the first sequence of emotional states performed by the first animated character 212(1), or (3) whether the first sequence of emotional states performed by the first animated character 212(1) and the second sequence of emotional states performed by the second animated character 212(2) similarly represent the speech. As described herein, an input device 218 may include, but is not limited to, a mouse, a keyboard, a touch-sensitive screen, a microphone, and/or any other type of input device.

As further illustrated by the example of FIG. 2, based at least on the input(s) from the user(s), the computing device(s) 214 may generate training data 222 (which may represent, and/or include, the training data 110) representing at least the speech, the sequences of emotional states, and/or the selection(s) made by the user(s) (e.g., which sequence of emotional states better represents the speech and/or whether the sequences of emotional states equally represent the speech). Additionally, the processing component(s) 202 and/or the computing device(s) 214 may perform similar processes to generate additional training data 222 associated with one or more additional instances of speech.

Referring back to the example of FIG. 1, the process 100 may include a training component 112 using the training data 110 to initially train one or more machine learning models 114 (also referred to, in some examples, as a "second machine learning model(s) 114"). As described herein, in some examples, the second machine learning model(s) 114 may correspond to one or more rewards models that are configured to determine scores indicating whether sequences of emotional states accurately represent the actual emotional states associated with speech (and/or other types of sound). For instance, to train the second machine learning model(s) 114, the training component 112 may input the training data 110 representing the speech and the sequences of emotional states associated with the speech into the second machine learning model(s) 114. The second machine learning model(s) 114 may process the training data 110 and, based at least on the processing, output scores associated with the sequences of emotional states. The training component 112 may then update one or more parameters and/or weights associated with the second machine learning model(s) 114 using the scores.

Figure 3:
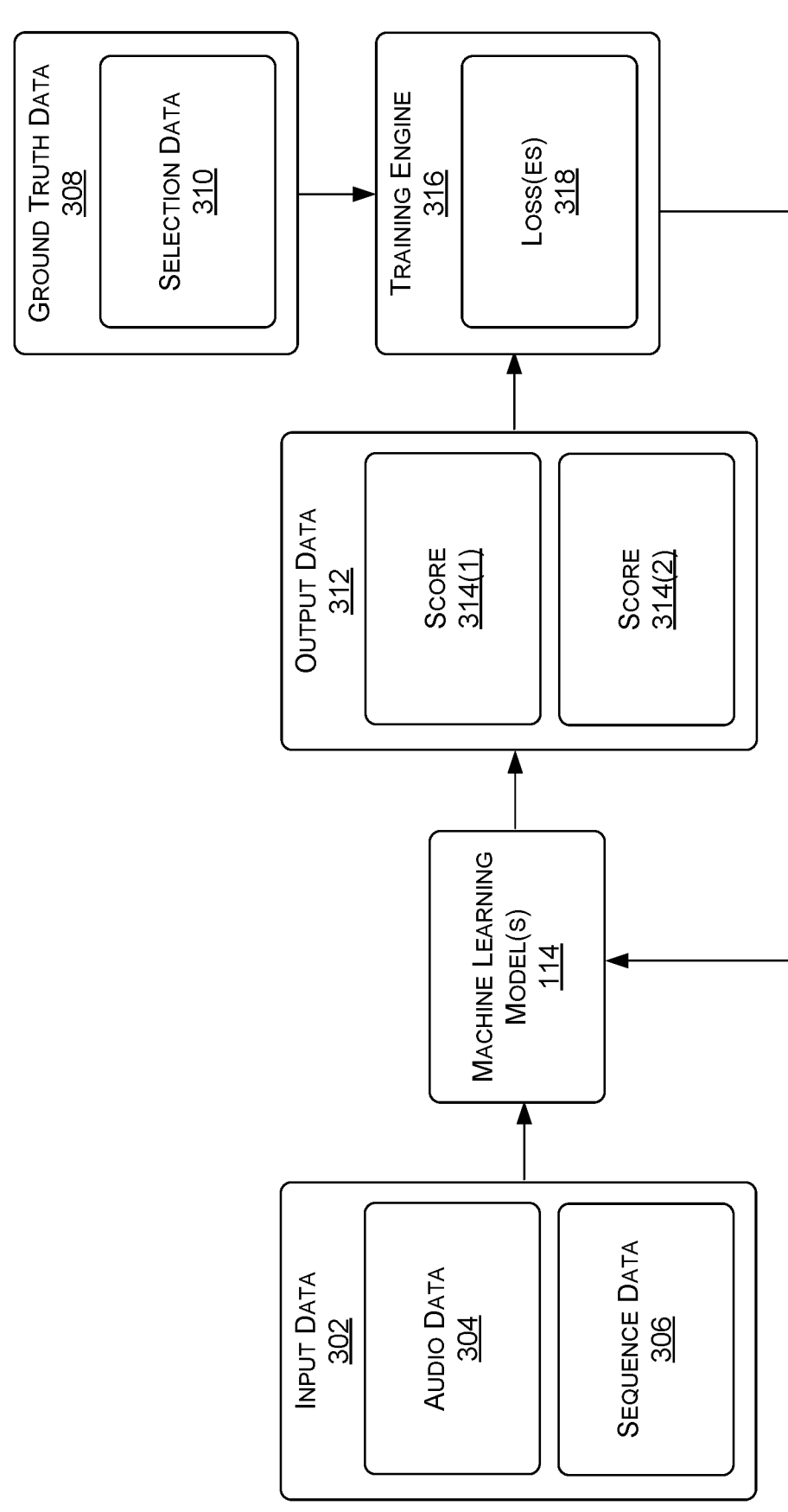
FIG. 3 illustrates an example of training one or more machine learning models to generate scores indicating whether sequences of emotional states accurately represent actual emotional states associated with speech, in accordance with some embodiments of the present disclosure.

For more details, FIG. 3 illustrates an example of training the second machine learning model(s) 114 to generate scores indicating whether sequences of emotional states accurately represent the actual emotional states associated with speech, in accordance with some embodiments of the present disclosure. As shown, the training component 112 may train the second machine learning model(s) 114 using input data 302 (which may represent, and/or include, at least a portion of the training data 110). In the example of FIG. 3, the input data 302 includes at least audio data 304 representing one or more instances of speech as well as sequence data 306 representing one or more sequences of emotional states associated with the instance(s) of speech. As described herein, one or more users may have already performed one or more of the processes described herein to determine which sequences of emotional states better represent the instance(s) of speech represented by the audio data 304.

For example, the second machine learning model(s) 114 may be trained using the input data 302 as well as corresponding ground truth data 308 (which may also represent, and/or include, at least a portion of the training data 110). For an instance of speech, the ground truth data 308 may include at least selection data 310 representing an indication of whether a sequence of emotional states better represents the speech as compared to another sequence of emotional states and/or whether the sequences of emotional states equally represent the speech. For a first example, and using the example of FIG. 2, if the user(s) indicates that the first video 210(1) better represents the speech as compared to the second video 210(2), then the selection data 310 may indicate that the first sequence of emotional states associated with the first sequence video 210(1) better represents the speech as compared to the second sequence of emotional states associated with the second video 210(2). For a second example, if the user(s) indicates that the first video 210(1) and the second video 210(2) equally represent the speech, then the selection data 310 may indicate that the first sequence of emotional states associated with the first video 210(1) and the second sequence of emotional states associated with the second video 210(2) equally represent the speech.

As described herein, the second machine learning model(s) 114 may process the input data 302 and, based at least on the processing, output data 312 indicating scores 314(1)-(2) (also referred to singularly as "score 314" or in plural as "scores 314"). For example, and for a single instance of speech, the second machine learning model(s) 114 may process the audio data 304 representing the speech as well as the sequence data 306 representing the first sequence of emotional states. Based at least on the processing, the second machine learning model(s) 114 may output a first score 314(1) indicating whether the first sequence of emotional states accurately represents the actual emotional states associated with the speech. The second machine learning model(s) 114 may also process the audio data 304 representing the speech as well as the sequence data 306 representing the second sequence of emotional states. Based at least on the processing, the second machine learning model(s) 114 may output a second score 314(2) indicating whether the second sequence of emotional states accurately represents the actual emotional states associated with the speech. The second machine learning model(s) 114 may then perform similar processes to determine scores 314 associated with one or more additional instances of speech. As described herein, a score may be within a range of scores, such as −1 to 1, 0 to 1, 0 to 10, and/or any other range. Additionally, in some examples, a higher score may indicate that a sequence of emotional states better represents the speech as compared to a lower score.

A training engine 316 may use one or more loss functions that measure loss 318 (e.g., error) in the output data 312 as compared to the ground truth data 308. Any type of loss function may be used, such as cross entropy loss, mean squared error, mean absolute error, mean bias error, and/or other loss function types. In some examples, different outputs 312 may have different loss functions. In some examples, backward pass computations may be performed to recursively compute gradients of the loss function(s) with respect to training parameters. In some examples, weights and biases of the second machine learning model(s) 114 may be used to compute these gradients.

For an example of determining a loss 318, and for an instance of speech, the training engine 316 may use a first score 314(1) for a first sequence of emotional states associated with the speech, a second score 314(2) for a second sequence of emotional states associated with the speech, and the indication of whether the first sequence of emotional states better represents the speech as compared to the second sequence of emotional states to determine the loss 318. For example, if the indication is that the first sequence of emotional states does better represent the speech as compared to the second sequence of emotional states and the first score 314(1) is greater than the second score 314(2), then the training engine 316 may determine no loss 318 and/or a smaller loss 318. However, if the indication is again that the first sequence of emotional states does better represent the speech as compared to the second sequence of emotional states, but the first score 314(1) is less than the second score 314(2), then the training engine 316 may determine a larger loss 318. The training engine 316 may then use similar processes for one or more additional instances of speech.

Referring back to the example of FIG. 1, the process 100 may include a training component 116 using the second machine learning model(s) 114 and audio data 118 to train the first machine learning model(s) 102. As described herein, the first machine learning model(s) 102 may be configured to determine sequences of emotional states associated with instances of speech represented by the audio data 118 (and/or other audio data). To train the first machine learning model(s) 102, and for an instance of speech, the training component 116 may input the audio data 118 representing the instance of speech into the first machine learning model(s) 102. The first machine learning model(s) 102 may then process the audio data 118 and, based at least on the processing, output data representing a sequence of emotional states associated with the speech. As described herein, data representing a sequence of emotional states may include one or more vectors, where a respective vector represents a respective emotional state.

The training component 116 may then input the audio data 118 representing the instance of speech and the data representing the sequence of emotional states into the second machine learning model(s) 114. The second machine learning model(s) 114 may then process the inputted data and, based at least on the processing, determine a score associated with the sequence of emotional states. As described herein, the score may indicate how accurately the sequence of emotional states represents the speech. The training component 116 may then update one or more parameters and/or weights associated with the first machine learning model(s) 102 based at least on the score. Additionally, the training component 116 may perform similar processes to further train the first machine learning model(s) 102 using additional audio data 118 representing one or more additional instances of speech.

Figure 4:
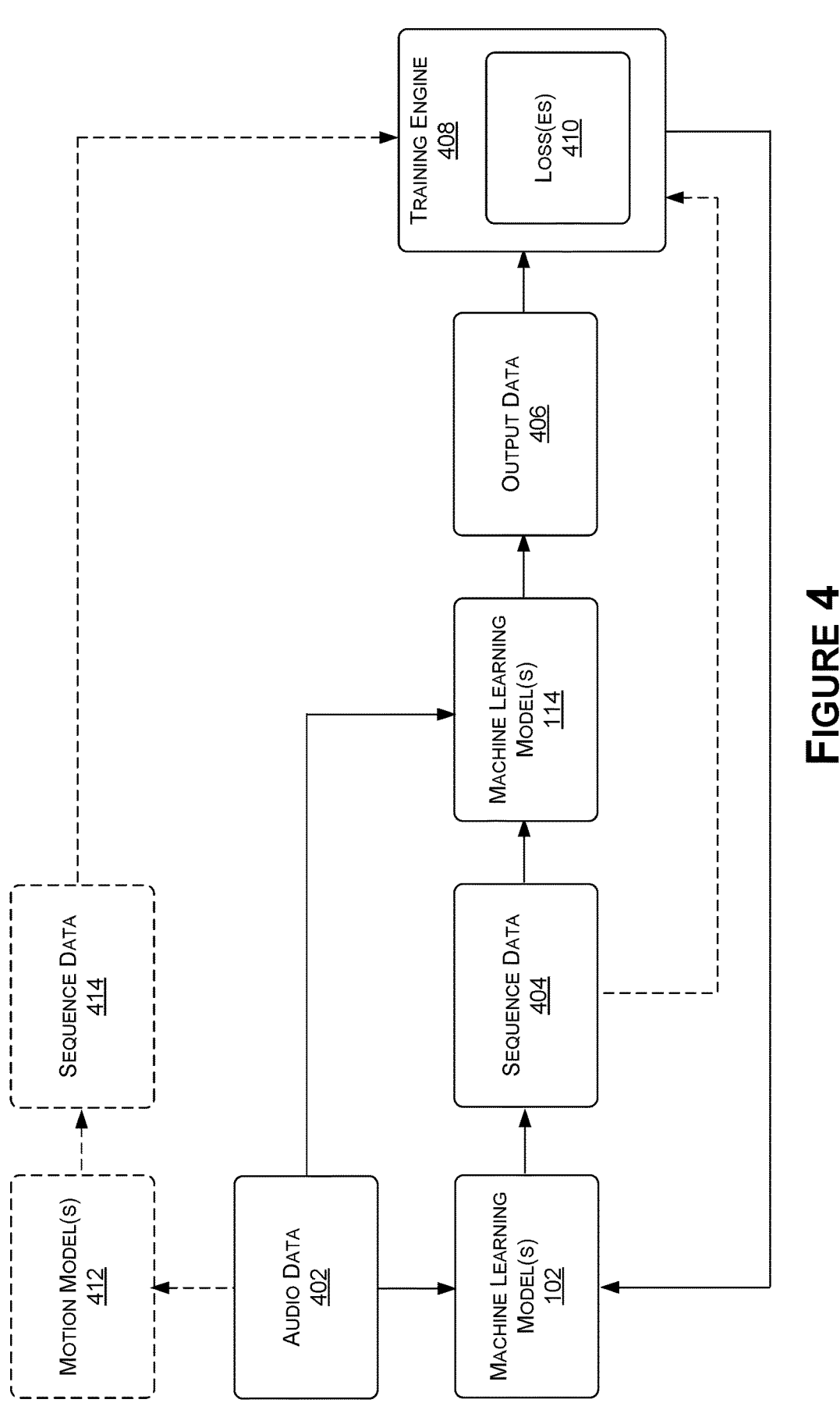
FIG. 4 illustrates an example of training one or more machine learning models to determine sequences of emotional states associated with speech, in accordance with some embodiments of the present disclosure.

For more details, FIG. 4 illustrates an example of training the first machine learning model(s) 102 to determine sequences of emotional states associated with speech, in accordance with some embodiments of the present disclosure. As shown, the training component 116 may train the first machine learning model(s) 102 using at least audio data 402 (which may represent, and/or include, the audio data 118). As described herein, the audio data 402 may represent one or more instances of speech (and/or other sounds).

For instance, the first machine learning model(s) 102 may process the audio data 402 representing an instance of speech and, based at least on the processing, output sequence data 404 representing a sequence of emotional states associated with the speech. As described herein, in some examples, the sequence data 404 may include one or more vectors, where a respective vector represents a respective emotional state at a time instance associated with the speech. The training component 116 may then input the sequence data 404 into the second machine learning model(s) 114. Additionally, the second machine learning model(s) 114 may process the sequence data 404 and, based at least on the processing, output data 406 (which may be similar to the output data 312) representing at least a score associated with the sequence of emotional states. For instance, if the sequence of emotional states accurately represents the speech, then the score represented by the output data 406 may be high. However, if the sequence of emotional states does not accurately represent the speech, then the score represented by the output data 406 may be low.

A training engine 408 may use one or more loss functions that measure loss 410 (e.g., error) based on the output data 406. For example, if the score is high such that the sequence of emotional states accurately represents the speech, the training engine 408 may determine a first loss 410 associated with the instance of speech. However, if the score is low such that the sequence of emotional states does not accurately represent the speech, then the training engine 408 may determine a second loss 410 associated with the instance of speech. Any type of loss function may be used, such as cross entropy loss, mean squared error, mean absolute error, mean bias error, and/or other loss function types. In some examples, backward pass computations may be performed to recursively compute gradients of the loss function(s) with respect to training parameters. In some examples, weights and biases of the first machine learning model(s) 102 may be used to compute these gradients.

As further illustrated in the example of FIG. 4, in some examples, the training component 116 may train the first machine learning model(s) 102 using one or more machine learning models 412 (also referred to, in some examples, as a "third machine learning model(s) 412"). In such examples, the third machine learning model(s) 412 may correspond to another machine learning model(s) that is trained to determine sequences of emotional states associated with instances of speech, similar to the first machine learning model(s) 102. For instance, in some examples, the third machine learning model(s) 412 may include the first machine learning model(s) 102 before additional training is performed in order to improve the performance of the first machine learning model(s) 102.

To perform the further training, and for the instance of speech described above, the training component 116 may also input the audio data 402 representing the instance of speech into the third machine learning model(s) 412. The third machine learning model(s) 412 may process the audio data 402 representing the instance of speech and, based at least on the processing, output sequence data 414 representing a sequence of emotional states associated with the speech. As described herein, in some examples, and similar to the sequence data 404, the sequence data 414 may include one or more vectors, where a respective vector represents a respective emotional state at a time instance associated with the speech. The training engine 408 may then use the sequence data 404 and the sequence data 414 when training the first machine learning model(s) 102.

For example, the training engine 408 may determine a first loss 410 based at least on the score represented by the output data 406 and a second loss 410 based on comparing the sequence of emotional states represented by the sequence data 404 to the sequence of emotional states represented by the sequence data 414. The training engine 408 may then determine a final loss 410 using at least the first loss 410 and the second loss 410. In some examples, when determining the final loss 410, the training engine 408 may provide more or less weight to the first loss 410 and/or the second loss 410 (e.g., the second loss 410 may be multiplied by a factor). The final loss 410 may then be used to update one or more parameters and/or weights associated with the first machine learning model(s) 102.

In examples where the training component 116 uses the third machine learning model(s) 412 when training the first machine learning model(s) 102, the training component 116 may perform such processes in order to ensure that the determinations made by the first machine learning model(s) 102 do not differ too greatly from the third machine learning model(s) 412. For instance, and as described herein, the third machine learning model(s) 412 may have already been at least partially trained to determine the sequences of emotional states associated with instances of speech. As such, if the sequence of emotional states determined by the first machine learning model(s) 102 differs greatly from the sequence of emotional states determined by the third machine learning model(s) 412, then that may indicate that the first machine learning model(s) 102 is determining inaccurate results.

Referring back to the example of FIG. 1, in some examples, the process 100 may include continuing to train the second machine learning model(s) 114 and/or the first machine learning model(s) 102 until the occurrence of one or more events. For example, the training of the second machine learning model(s) 114 and/or the first machine learning model(s) 102 may continue until a number of the scores and/or a percentage of the scores output by the second machine learning model(s) 114 when training the first machine learning model(s) 102 satisfy (e.g., are equal to or greater than) a threshold score. The number of scores may include, but is not limited to, one score, five scores, ten scores, fifty scores, one hundred scores, and/or any other number of scores. Additionally, the percentage of scores may include, but is not limited to, 75%, 80%, 90%, 95%, 99%, and/or any other percentage. In such an example, the training may be complete when such an event occurs since the event may indicate that the first machine learning model(s) 102 is determining sequences of emotional states that accurately reflect the actual emotional states associated with speech.

While the examples described herein are directed to training the first machine learning model(s) 102 to determine sequences of emotional states for animating characters, in some examples, similar processes may be used to train the first machine learning model(s) 102 to determine other types of motions associated with speech. For example, similar processes may be performed to train the first machine learning model(s) 102 to determine sequences of gestures for animating characters, sequences of facial expressions for animated characters, and/or any other types of motions associated with speech. In such an example, the second machine learning model(s) 114 may be trained to determine scores associated with the type of motion for which the first machine learning model(s) 102 is being trained, similar to training the second machine learning model(s) 114 to determine the scores associated with the sequences of emotional states.

Figure 5:
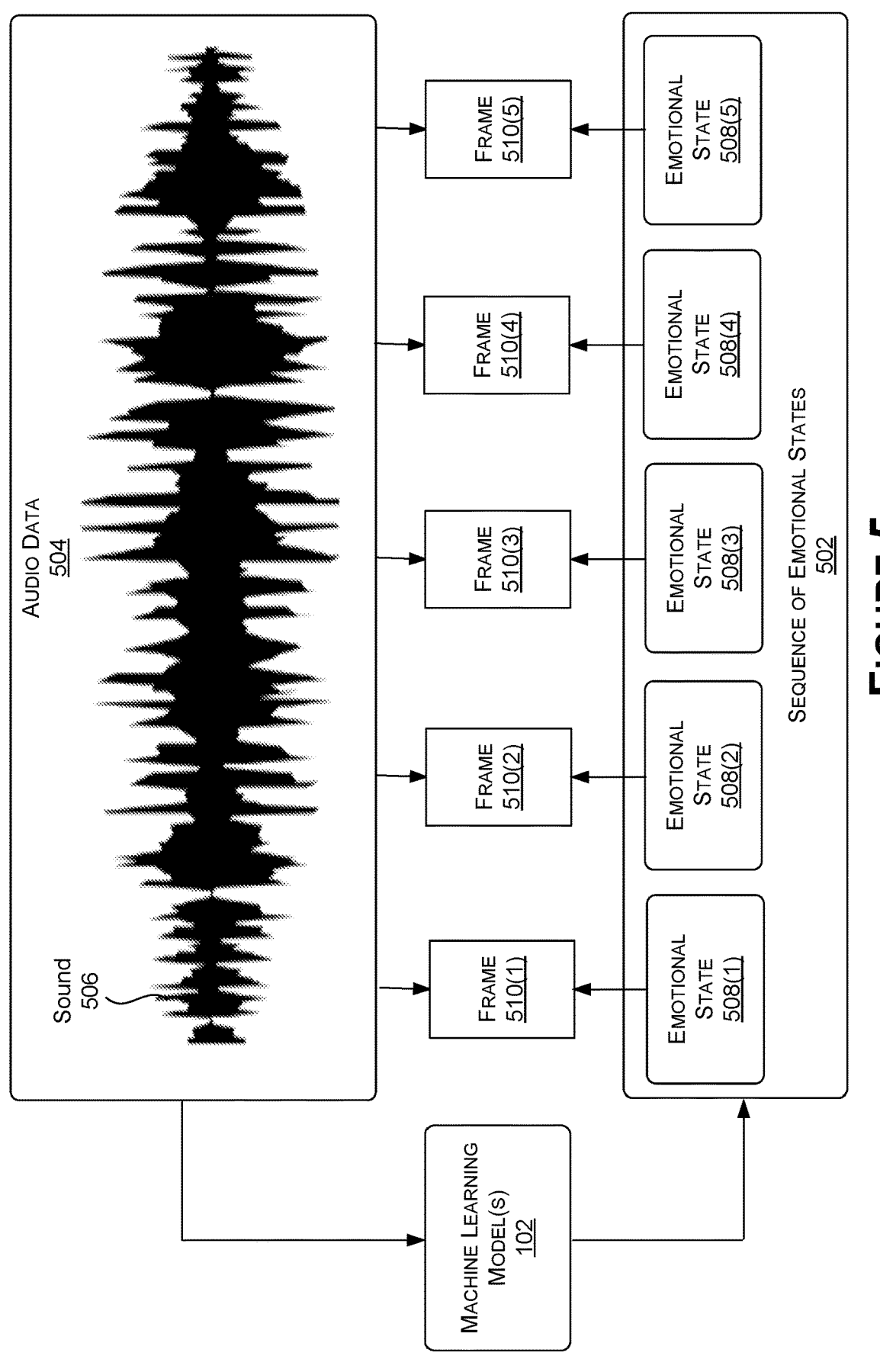
FIG. 5 illustrates an example of determining a sequence of emotional states associated with speech, in accordance with some embodiments of the present disclosure.

FIG. 5 illustrates an example of determining a sequence of emotional states 502 associated with speech, in accordance with some embodiments of the present disclosure. As shown, the first machine learning model(s) 102 may process audio data 504 representing sound 506 (e.g., speech). Based at least on the processing, the first machine learning model(s) 102 may determine the sequence of emotional states 502 associated with the sound 506. As shown, the sequence of emotional states 502 includes emotional states 508(1)-(5) (also referred to singularly as "emotional state 508" or in plural as "emotional states 508"). While the example of FIG. 5 illustrates the sequence of emotional states 502 as including the five emotional states 508, in other examples, a sequence of emotional states may include any number of emotional states.

As described herein, an emotional state 508 may include, but is not limited to, anger, disgust, fear, joy, neutral, sad, happy, scared, and/or any other type of emotional state. In some examples, the emotional states 508 may be associated with different times and/or keyframes associated with the audio data 504. For example, the first emotional state 508(1) may be associated with a first time and/or a first keyframe 510(1), the second emotional state 508(2) may be associated with a second time and/or a second keyframe 510(2), the third emotional state 508(3) may be associated with a third time and/or a third keyframe 510(3), the fourth emotional state 508(4) may be associated with a fourth time and/or a fourth keyframe 510(4), and/or the fifth emotional state 508(5) may be associated with a fifth time and/or a fifth keyframe 510(5). In some examples, the timesteps between the emotional states 508 and/or the number of frames between the keyframes may be similar. In some examples, the timesteps between the emotional states 508 and/or the number of frames between the keyframes may differ.

Figure 6:
FIG. 6 illustrates an example data flow diagram for a process of animating a character using a sequence of emotional states, in accordance with some embodiments of the present disclosure.

FIG. 6 illustrates an example data flow diagram for a process 600 of animating a character, in accordance with some embodiments of the present disclosure. As shown, the process 600 may include the first machine learning model(s) 102 processing audio data 602 representing speech (e.g., in the form of audio, or in the form of a spectrogram, such as a mel-spectrogram, or the like). As described herein, the speech may include human generated speech, machine generated speech, and/or any other type of speech. Based at least on the processing, the first machine learning model(s) 102 may generate sequence data 604 representing a sequence of emotional states associated with the speech. For example, the sequence of emotional states may include at least a first emotional state associated with a first portion of the speech, a second emotional state associated with a second portion of the speech, a third emotional state associated with a third portion of the speech, and/or so forth.

The process 600 may then include an animation component 606 processing at least the audio data 602 and the sequence data 604 in order to generate animation data 608. As described herein, the animation component 606 may include a machine learning model, a neural network, and/or any other type of component that is configured to perform the processes described herein. Additionally, the animation data 608 may represent a presentation 610 that includes an animated character 612 that is animated according to the sequence of emotional states and the speech represented by the audio data 602. For example, the animated character 612 may portray the first emotional state during the first portion of the speech, the second emotional state during the second portion of the speech, the third emotional state during the third portion of the speech, and/or so forth.

Now referring to FIGS. 7-10, each block of methods 700, 800, 900, and 1000, described herein, comprises a computing process that may be performed using any combination of hardware, firmware, and/or software. For instance, various functions may be carried out by a processor executing instructions stored in memory. The methods 700, 800, 900, and 1000 may also be embodied as computer-usable instructions stored on computer storage media. The methods 700, 800, 900, and 1000 may be provided by a standalone application, a service or hosted service (standalone or in combination with another hosted service), or a plug-in to another product, to name a few. In addition, the methods 700, 800, 900, and 1000 are described, by way of example, with respect to FIGS. 1 and 6. However, these methods 700, 800, 900, and 1000 may additionally or alternatively be executed by any one system, or any combination of systems, including, but not limited to, those described herein.

FIG. 7 illustrates a flow diagram showing a method 700 for determining a sequence of emotional states associated with speech, in accordance with some embodiments of the present disclosure. The method 700, at block B702, may include receiving audio data representative of speech. For instance, the first machine learning model(s) 102 may receive the audio data 602 representative of the speech. As described herein, the speech may include human generated speech, machine generated speech, and/or any other type of speech. In some examples, the speech is configured to be output using the animated character 612. In some examples, the audio data may be pre-processed to put the audio data into a different format suitable for processing using a machine learning model. For example, the audio may be converted to a visual representation such as a spectrogram.

The process 700, at block B704, may include applying the audio data as input to one or more machine learning models. For instance, the audio data 602 may be input into the first machine learning model(s) 102.

The process 700, at block B706, may include generating, using the one or more machine learning models and based at least on the audio data, a sequence of emotional states associated with the speech. For instance, the first machine learning model(s) 102 may process the audio data 602 and, based at least on the processing, generate the sequence data 604 representing the sequence of emotional states. In some examples, the sequence data 604 may then be used to animate the character 612. For example, the sequence data 604 may be used to cause the character 5612 to express the emotional states associated with the sequence of emotional states while the speech is also being output.

FIG. 8 illustrates a flow diagram showing a method 800 for training one or more machine learning models to determine sequences of emotional states associated with speech, in accordance with some embodiments of the present disclosure. The method 800, at block B802, may include determining, using one or more first machine learning models and based at least on audio data, a sequence of emotional states. For instance, the first machine learning model(s) 102 may process the audio data 118. As described herein, in some examples, the audio data 118 may represent speech and/or other sounds. Based at least on the processing, the first machine learning model(s) 102 may determine the sequence of emotional states that is associated with the audio data 118.

The method 800, at block B804, may include determining, using one or more second machine learning models and based at least on the sequence of emotional states, a score. For instance, the second machine learning model(s) 114 may process the audio data 118 and the sequence of emotional states. Based at least on the processing, the second machine learning model(s) 114 may determine the score associated with the sequence of emotional states. For instance, and as described herein, the score may indicate how accurately the sequence of emotional states represents actual emotional states associated with the speech. For example, a high score may indicate that the sequence of emotional states accurately represents the actual emotional states associated with the speech. Additionally, a low score may indicate that the sequence of emotional states does not accurately represent the actual emotional states associated with the speech.

The method 800, at block B806, may include training the one or more first machine learning models based at least on the score. For instance, the training component 116 may use the score to train the first machine learning model(s) 102. In some examples, the training includes determining a loss using the score and then updated one or more parameters and/or weights associated with the first machine learning model(s) 102 based at least on the loss.

FIG. 9 illustrates a flow diagram showing a method 900 for training one or more machine learning models to determine scores associated with sequences of emotional states, in accordance with some embodiments of the present disclosure. The method 900, at block B902, may include receiving ground truth data representative of one or more ratings for sequences of emotional states associated with audio data. For instance, the training component 112 may receive the ground truth data (e.g., the training data 110, the ground truth data 308, etc.) that includes the rating(s) for the sequences of emotional states. As described herein, the ground truth data may be generated based on one or more user inputs, where the user input(s) indicates which video depicting a character performing a sequence of emotional states better represents the speech and/or whether two videos depicting characters performing sequences of emotional states equally represent the speech.

The method 900, at block B904, may include determining, using one or more machine learning models and based at least on the audio data and the sequences of emotional states, scores associated with the sequences of emotional states. For instance, the second machine learning model(s) 114 may process the audio data 106 and the sequence of emotional states and, based at least on the processing, determine the scores associated with the sequences of emotional states. As described herein, in some examples, the second machine learning model(s) 114 may determine a respective score for one or more (e.g., each) of the sequences of emotional states.

The method 900, at block B906, may include training the one or more machine learning models based at least on the ground truth data and the scores. For instance, the training component 112 may train the second machine learning model(s) 114 using at least the ground truth data and the scores associated with the sequences of emotional states. As described herein, training the second machine learning model(s) 114 may include determining a loss using the ground truth data and the scores and then updating one or more parameters and/or weights associated with the second machine learning model(s) 114 based on the loss.

FIG. 10 illustrates a flow diagram showing a method 1000 for training one or more machine learning models to determine sequences of emotional states, in accordance with some embodiments of the present disclosure. The method 1000, at block B1002, may include training, using first audio data representative of first user speech and one or more first sequences of emotional states associated with the first speech, one or more first machine learning models to determine one or more scores associated with the one or more first sequences of emotional states. For instance, the training component 112 may use the training data 110 to train the second machine learning model(s) 114 (which may correspond to the one or more first machine learning models in the example of FIG. 10). As described herein, the training data 110 may include the audio data 106 representing the first speech, the sequence data 108 representing the one or more first sequences of emotional states, and/or data indicating which sequence(s) of emotional states better represent actual emotional states associated with the first speech. Based at least on the training, the second machine learning model(s) 114 may be trained to then determine the one or more scores indicating whether the one or more second sequences of emotional states represent actual emotional states associated with speech.

The method 1000, at block B1004, may include training, using the one or more first machine learning models and second audio data representative of second speech, one or more second machine learning models to determine the one or more second sequences of emotional states associated with the second speech. For instance, training component 116 may use the second machine learning model(s) 114 and the audio data 118 representing the second speech to train the first machine learning model(s) 102 (which may correspond to the one or more second machine learning models in the example of FIG. 10). As described herein, the training may use one or more scores associated with the one or more second sequences of emotional states that the first machine learning model(s) 102 determined based on processing the audio data 118.

Example Computing Device

Figure 11:
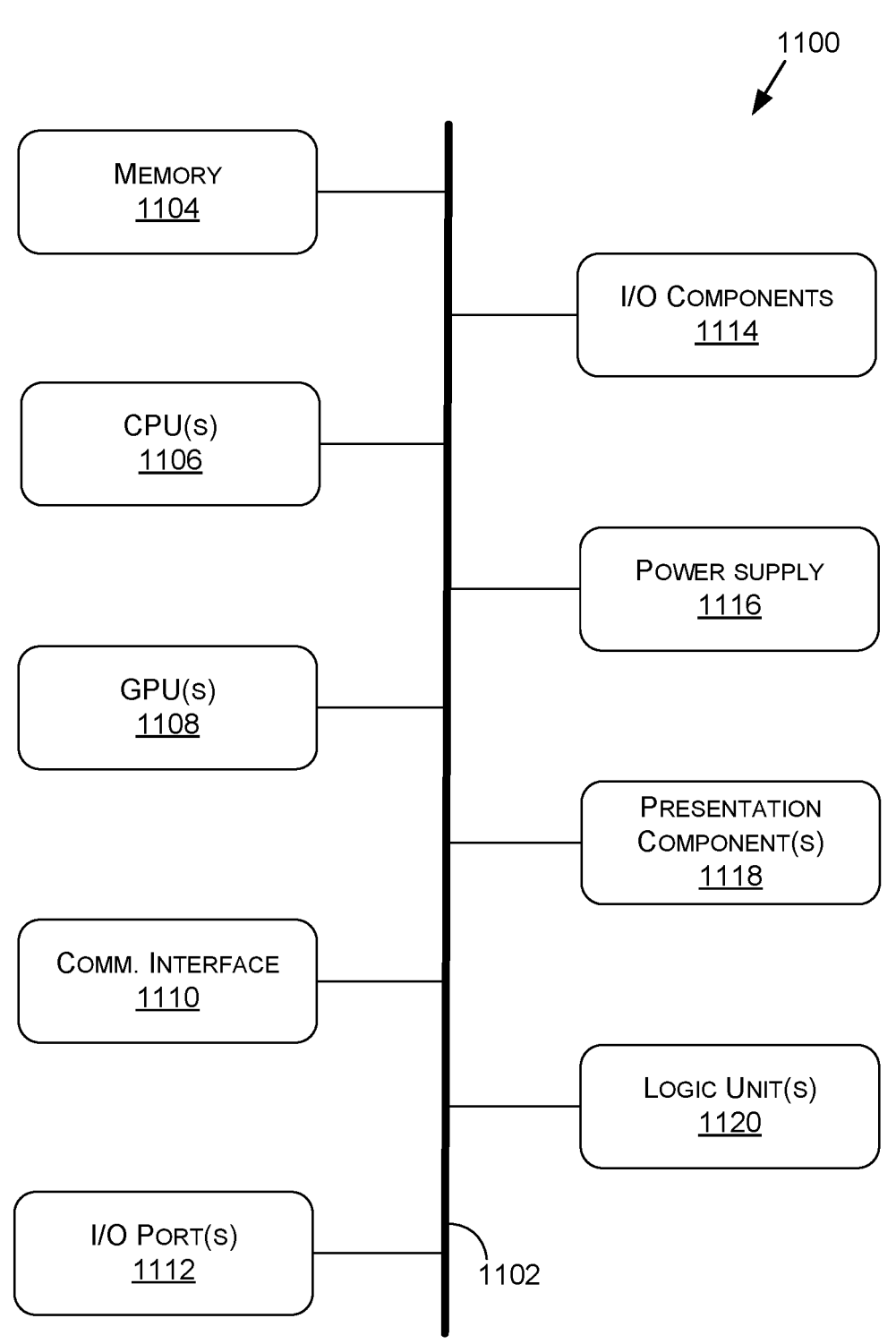
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1108 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1120 and/or communication interface 1110 may include one or more data processing units (DPUs) to transmit data received over a network and/or through interconnect system 1102 directly to (e.g., a memory of) one or more GPU(s) 1108.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, DPUs, etc.), and output the data (e.g., as an image, video, sound, etc.).

Example Data Center

Figure 12:
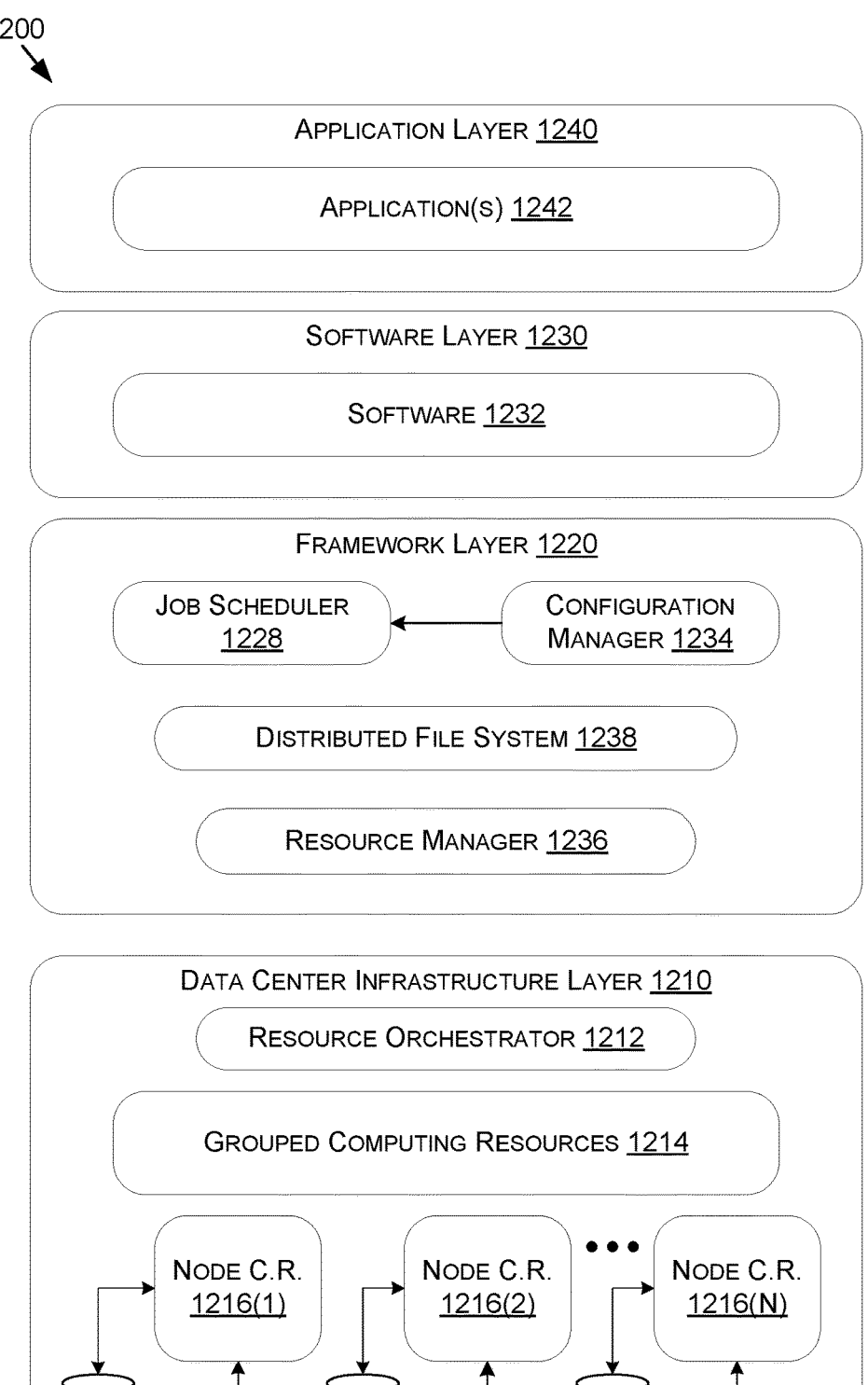
FIG. 12 is a block diagram of an example data center suitable for use in implementing some embodiments of the present disclosure.

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240.

As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161(N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1212 may configure or otherwise control one or more node C.R.s 1216(1)-1216(N) and/or grouped computing resources 1214. In at least one embodiment, resource orchestrator 1212 may include a software design infrastructure (SDI) management entity for the data center 1200. The resource orchestrator 1212 may include hardware, software, or some combination thereof.

In at least one embodiment, as shown in FIG. 12, framework layer 1220 may include a job scheduler 1228, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application(s) 1242 may respectively include web-based service software or applications, such as those provided by Amazon Web Services, Google Cloud and Microsoft Azure. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1228 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1228. In at least one embodiment, clustered or grouped computing resources may include grouped computing resource 1214 at data center infrastructure layer 1210. The resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216 (1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining, using one or more first machine learning models and based at least on first audio data representative of first speech, a first sequence of emotional states, wherein the one or more first machine learning models are trained, at least, by:

determining, based at least on the one or more first machine learning models processing second audio data representative of second speech, a second sequence of emotional states associated with the second speech;

determining, based at least on one or more second machine learning models processing the second audio data and input data representative of the second sequence of emotional states, a score associated with the second sequence of emotional states as determined using the one or more first machine learning models; and updating one or more parameters of the one or more first machine learning models based at least on the score determined using the one or more second machine learning models.

2. The method of claim 1, wherein the first sequence of emotional states indicates at least a first emotional state associated with a first portion of the first audio data and a second emotional state associated with a second portion of the first audio data.

3. The method of claim 1, wherein the score indicates a similarity between one or more predicted emotional states associated with the second sequence of emotional states and one or more actual emotional states associated with the second speech represented by the second audio data.

4. The method of claim 1, wherein the updating the one or more first machine learning models comprises:

determining a loss based at least on the score; and updating, based at least on the loss, the one or more parameters associated with the one or more first machine learning models.

5. The method of claim 1, wherein the one or more first machine learning models are further trained, at least, by:

generating training data representative of at least third speech, a third sequence of emotional states associated with the third speech, a fourth sequence of emotional states associated with the third speech, and an indication that the third sequence of emotional states better reflects the third speech than the fourth sequence of emotional states; and updating one or more second parameters of the one or more second machine learning models based at least on the training data.

6. The method of claim 5, wherein the generating the training data comprises:

generating, based at least on third audio data representative of the third speech and the third sequence of emotional states, first video data representative of a first video depicting a first animation associated with the third sequence of emotional states;

generating, based at least on the third audio data representative of the third speech and the fourth sequence of emotional states, second video data representative of a second video depicting a second animation associated with the fourth sequence of emotional states;

receiving second input data representative of a selection that the first video better represents the third speech as compared to the second video; and generating the training data based at least on the third audio data, the third sequence of emotional states, the fourth sequence of emotional states, and the selection.

7. The method of claim 5, wherein the updating the one or more second parameters of the one or more second machine learning models comprises:

determining, using the one or more second machine learning models and based at least on third audio data representative of the third speech and the third sequence of emotional states, a second score associated with the third sequence of emotional states;

determining, using the one or more second machine learning models and based at least on the third audio data representative of the third speech and the fourth sequence of emotional states, a third score associated with the fourth sequence of emotional states; and updating, based at least on the second score, the third score, and the indication that the third sequence of emotional states better reflects the third speech as compared to the fourth sequence of emotional states, the one or more second parameters of the one or more second machine learning models.

8. The method of claim 1, wherein the one or more first machine learning models are further trained, at least, by:

determining, using one or more third machine learning models and based at least on the second audio data, a third sequence of emotional states, wherein the updating the one or more parameters of the one or more first machine learning models is further based at least on the third sequence of emotional states.

9. A system comprising:

one or more processors to:

train, using first audio data representative of first speech and one or more first sequences of emotional states associated with the first speech, one or more first machine learning models to determine one or more scores associated with one or more second sequences of emotional states; and update, using the one or more first machine learning models and based at least on second audio data representative of second speech and the one or more second sequences of emotional states determined using one or more second machine learning models processing input data associated with the second speech, one or more parameters of the one or more second machine learning models to determine one or more third sequences of emotional states associated with third speech.

10. The system of claim 9, wherein the one or more processors are further to determine, using the one or more second machine learning models and based at least on third audio data representative of the third speech, the one or more third sequences of emotional states associated with the third speech.

11. The system of claim 9, wherein the one or more second machine learning models are trained, at least, by:

determining, using the one or more second machine learning models and based at least on the input data, the one or more second sequences of emotional states associated with the second speech;

determining, using the one or more first machine learning models and based at least on the second audio data and the one or more second sequences of emotional states, the one or more scores associated with the one or more second sequences of emotional states; and updating the one or more parameters of the one or more second machine learning models based at least on the one or more scores.

12. The system of claim 11, wherein the updating the one or more parameters of the one or more second machine learning models comprises:

determining one or more losses based at least on the one or more scores; and updating, based at least on the one or more losses, the one or more parameters of the one or more second machine learning models.

13. The system of claim 9, wherein the one or more first machine learning models are trained, at least, by:

determining, using the one or more first machine learning models and based at least on the first audio data and the one or more first sequences of emotional states, one or more scores associated with the one or more first sequences of emotional states; and updating one or more parameters of the one or more first machine learning models based at least on the one or more scores.

14. The system of claim 13, wherein the one or more first machine learning models are further trained, at least, by:

generating training data indicating that at least a first sequence of emotional states of the one or more first sequences of emotional states better represents the first speech as compared to a second sequence of emotional states of the one or more first sequences of emotional states, wherein the updating the one or more parameters of the one or more first machine learning models is further based at least on the training data.

15. The system of claim 14, wherein the generating the training data comprises:

generating, based at least on the first audio data representative of the first speech and the first sequence of emotional states, first video data representative of a first video depicting a first animation associated with the first sequence of emotional states;

generating, based at least on the first audio data representative of the first speech and the second sequence of emotional states, second video data representative of a second video depicting a second animation associated with the second sequence of emotional states;

receiving input data representative of a selection that the first video better represents the first speech as compared to the second video; and generating the training data based at least on the input data.

16. The system of claim 9, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system implemented using one or more large language models;

a system for performing conversational AI operations;

a system for generating synthetic data;

a system incorporating one or more virtual machines (VMs);

a system implemented at least partially in a data center; or a system implemented at least partially using cloud computing resources.

17. One or more processors comprising processing circuitry to:

determine, using one or more first machine learning models and based at least on audio data representative of first speech, a first sequence of emotional states associated with the first speech, wherein the one or more first machine learning models are trained using one or more second machine learning models that determine one or more scores associated with one or more second sequences of emotional states that are determined using the one or more first machine learning models processing input data associated with one or more instances of second speech.

18. The one or more processors of claim 17, wherein the one or more first machine learning models are further trained using one or more third machine learning models that also determine the one or more second sequences of emotional states.

19. The one or more processors of claim 17, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system implemented using one or more large language models;

a system for performing conversational AI operations;

a system for generating synthetic data;

a system incorporating one or more virtual machines (VMs);

a system implemented at least partially in a data center; or a system implemented at least partially using cloud computing resources.

20. The method of claim 1, wherein:

the determining the second sequence of emotional states comprises generating, by the one or more first machine learning models and based at least on the processing the second audio data representative of the second speech, the input data representative of the second sequence of emotional states associated with the second speech;

the determining the score comprises generating, by the one or more second machine learning models and based at least on the processing the second audio data and the input data representative of the second sequence of emotional states, output data representative of the score associated with the second sequence of emotional states as determined using the one or more first machine learning models.

* * * * *